Patented June 4, 1935

2,003,640

UNITED STATES PATENT OFFICE 2,003,640

RECOVERY OF NAPHTHENIC ACIDS

Julius A. Wunsch, New York, N. Y.

No Drawing. Application February 25, 1932,
Serial No. 595,237

3 Claims. (Cl. 260—108)

My present invention relates to the preparation of naphthenic acids, and more particularly to the recovery of such acids, as well as their utilization, in the refining of mineral oils.

A mixture of acids, known as naphthenic or petroleum acids, occurs in mineral oils primarily obtained at the present time from certain sources. The latter comprise Russia, Roumania and the United States, Texas and California being the primary producing States of mineral oils. The usual practice in refining such oils is to distill the oil over caustic soda, the sodium salts of the naphthenic acids remaining as a thick, black sludge containing a large percentage petroleum oil. Impure naphthenic acids are customarily recovered from the sludge by treating the latter with a mineral acid, sulfuric acid often being chosen as such an acid. These naphthenic acids are of great potential value. However, the widest commercial exploitation of the acids has been inhibited by the technological complexities, as well as high operating cost, encountered in completely separating the acids from the oil.

The prior art contains many illustrations of uneconomical methods of recovering naphthenic acids from the mineral oil sludge. In all of these methods it is clearly demonstrated that those skilled in the prior art have failed to realize, or appreciate, the true physical nature of the sludge. For example, solvent extraction methods, washing processes and like procedures have been resorted to in a vain attempt to completely free the naphthenic acids from the mineral oil.

Now, I have discovered that the mineral oil sludge, essentially existing as it does in the emulsoid state, must be treated in a manner radically different from the treatments proposed in the prior art. Briefly, I have experimentally confirmed the fact that the stability of the aforementioned emulsoid state must be appreciably minimized before a complete de-emulsification, and consequent complete separation of the oil and naphthenic acids, of the sludge can be effectively accomplished.

Hence, it can be stated that it is one of the prime objects of the present invention to provide a method of recovering naphthenic acids in the refining of mineral oil, which method consists in so treating the oil sludge residue that it is readily de-emulsified, de-emulsifying the treated sludge to separate the oil and naphthenate salts into two completely separate liquid phases, removing oil, and treating the salts to produce naphthenic acids.

Another important object of the present invention is to provide a novel method of recovering naphthenic acids from mineral oil, especially from the oil refining sludge containing the alkaline salts of naphthenic acids, which consists in dispersing the sludge in water, thinning the dispersed sludge with a mineral oil solvent, adding a de-emulsifying agent to form an aqueous layer of the alkaline naphthenate salts completely separated from the oil and solvent layer, and then treating the naphthenate salts to produce the naphthenic acids.

Another object of the present invention is to provide methods of utilizing naphthenic acids recovered from mineral oil sludges by a de-emulsifying process, which methods result in the production of highly valuable compounds adapted to be employed in such widely diverse uses as pigmented protective paints; plasticizers; lacquers, shatter-proof glass; polishing waxes; oil flotation promoters; rubber accelerators; and many other uses.

Still other objects of the present invention are to improve generally the simplicity and efficiency of mineral oil, sludge treatment in the recovery of naphthenic acids, and to particularly provide a treatment which will not only be highly economical and reliable in commercial operation, but readily adapted to large scale, continuous, plant operation.

The novel features which I believe to be characteristic of my invention are set forth in particularity in the appended claims, the invention itself however, will best be understood by the following description wherein there is indicated several methods whereby my invention may be carried into effect.

Before describing in detail the procedure to be followed in utilizing the present invention, the general aspects of the recovery process herein disclosed will be outlined. As stated heretofore, the present method of separating the oil and alkaline naphthenate salts of the mineral oil sludge depends for its success upon the breaking up of the emulsoid state existing between the oil and the salts. Hence, it is first essential to considerably minimize the stability of the bond (whatever its nature) existing between the oil and the naphthenate salts.

Accordingly, the sludge is completely dispersed in water, and the resulting aqueous mixture is maintained at a temperature sufficiently high to prevent gel-formation throughout the subsequent treatment. To the aqueous mixture is added a "thinner". The latter has a boiling point above the temperature of the aqueous sludge mixture, is of low viscosity, and acts as a solvent for the oil. The thinned mixture is thoroughly agitated in order to secure good contact between the oil and the thinner. Suitable thinners which can be utilized are benzol, toluol, xylol, naphtha, kerosene, ethyl ether, carbon tetrachloride, amyl alcohol, amyl chloride, butyl acetate and the like.

An agent is now added that will break the emulsion formed, and thus effect a complete separation of the oil and thinner from the aqueous solution of the naphthenate salts. Suitable de-emulsifying agents which can be employed comprise the water-soluble organic materials of relatively low viscosity, and the water-soluble salts of sodium, potassium and ammonia.

Illustrations of such de-emulsifying agents are methyl, ethyl, and propyl alcohol; acetone; methyl and ethyl acetate; butyl amine; sodium, potassium and ammonium chlorides; sulfates; nitrates; iodides; oxychlorides, etc.; or their mixtures. The layer of thinner and oil is then drawn off, and the remaining aqueous layer of alkaline naphthenate salts is treated with a mineral acid. The naphthenic acids are thus recovered.

The general process described above is also applicable to the recovery of naphthenic acids from mineral oil when the former are converted to the potassium or ammonium salts during the refining of the oil. Hence, the expression "alkaline naphthenates" is to be understood as referring to the sodium, potassium, or ammonium salts of the naphthenic acids. Again, although the present process is operative without the addition of a thinner, the oil separation in that case is slower and less efficient.

Accordingly, it will be appreciated that the present recovery process generally involves a dispersion, thinning and de-emulsification treatment to successfully separate the oil and alkaline naphthenates. To specifically instruct those skilled in the art the particular mode of carrying out the present process, the following exact description is given. It is to be understood, however, that the invention is not in any way limited, or restricted, by the following ingredients, proportions, manipulations, or step sequences.

Assume, then, that mineral oil from a given locality has been refined by distilling the oil over caustic soda, and that there remains a black sludge residue containing sodium naphthenates. 100 parts (all proportions are to be understood as by weight) of sludge containing about ten percent (10%) sodium naphthenates are mixed with 1600 parts of hot water, and the temperature of the mixture maintained at 90 to 100° C. through the remainder of the process. The mixture is stirred until dispersion is complete. 70 parts of toluene (the thinner) are added. The stirring is continued for a short time, and 45 parts of sodium chloride solution (1.16 specific gravity) are added.

The sodium chloride acts as the de-emulsifying agent. The stirring is resumed for a short period, and the mixture is allowed to stand until the separation is complete. The upper layer, containing the oil and toluene, is drawn off, and the remaining layer containing the sodium naphthenates is acidified with sulfuric acid thereby yielding the naphthenic acids practically pure. The separation of the naphthenic acid content from the sodium sulfate formed in the acidification is, of course, too well known to require description.

Local conditions affecting the composition of the sludge, convenience in handling the latter, and purity of naphthenic acids desired will, of course, determine variations in the aforedescribed specific illustration.

Thus, while the group of naphthenic acids referred to herein are characterized by boiling points ranging between 150° C. to 350° C., the present process may be applied to a sludge containing but one, or any predetermined number, of the group. Hence, the expression "naphthenic acid" or "naphthenate" used hereinafter is to be understood as meaning a member of the above group.

If the oil sludge contains an appreciable quantity of free alkali, it may be neutralized after the addition of the thinner by a mineral acid. The amount of de-emulsifying agent may then be correspondingly reduced, or further addition of such agent may even become unnecessary. The mineral acid would then act as the de-emulsifying agent. It is to be noted that the thinner may be added to the sludge before it is dispersed in water. Again, the water may contain the thinner and de-emulsification agent; or the dispersion and thinning may be simultaneously accomplished prior to de-emulsification.

The aqueous solution of the sodium naphthenates obtained after the oil separation may be used for further sludge extractions prior to the recovery of its naphthenic acid content. The aqueous solution of sodium naphthenate may be further purified by washing with additional quantities of thinner, before it is acidified. Of course, the entire process may be used in conjunction with other methods of refining or purification.

Having obtained naphthenic acid as a substantially pure product according to the aforementioned recovery process, the acid may be employed in widely diverse uses. Thus, a pigmented, elastic protective paint may be readily made by neutralizing naphthenic acid, as made above, with sodium hydroxide, and reacting the resulting sodium naphthenate with an aluminum salt, such as aluminum sulfate. The pigment is introduced into the reaction mixture. Hence, the precipitate of aluminum naphthenate carries down with it the pigment in fine admixture therewith. Introduction of the pigment prior to precipitation assures the production of a successful pigmented paint, since it is difficult to thoroughly mix the pigment with the naphthenate at a later point. The aluminum naphthenate and pigment precipitate is dried, and then mixed with turpentine until thoroughly dispersed. The resulting paint is an excellent protective paint for wood or steel, and is sufficiently elastic to resist wide variations in temperatures.

Naphthenic acid secured by the above recovery process is adapted for use in the manufacture of butyl naphthenate which is to be employed as a plasticizer. The acid is converted to the butyl ester by refluxing the acid with butyl alcohol while passing dry hydrogen chloride gas through the reaction mixture. The resulting reaction product is distilled to secure the butyl naphthenate. The latter serves as a desirable plasticizer for nitrocellulose and cellulose acetate paints and lacquers, since it permits the use of cheap solvents such as naphtha, benzol and the like. It is to be understood that instead of butyl alcohol, there may be used alcohols such as propyl, methyl, ethyl, benzyl, alcohol, to produce the respective naphthenic ester.

Another use to which the naphthenic acid can be put is in the production of cellulose naphthenate. The elasticity of the latter is five to ten times as great as cellulose nitrate and cellulose acetate, and therefore this compound is readily adapted for use in shatter-proof glass of the well known type wherein alternate layers of glass and cellulose compound are processed to form a sheet of glass. Further, since the cellulose naphthenate is readily soluble in cheap solvents, such as benzol, it can be used in elastic lacquers. Briefly, the cellulose naphthenate is made by reacting naphthenic acid with phosphorus pentachloride to yield naphthenic acid chloride. The latter is reacted with pure cellulose, in the presence of pyridine or aluminum chloride, to give the cellulose naphthenate. Of course, the aforedescribed naphthenate esters are readily usable as plasticizers in a cellulose naphthenate paint, since they are both soluble in cheap solvents, such as benzol.

Liquid, or solid, polishing waxes can be made from the naphthenic acid, procured as described herein, by reacting a polyhydric alcohol, such as glycol or glycerine, with the acid. The reaction is carried out in the presence of a condensation agent, such as hydrogen chloride gas or $SOCl_2$, and the resulting ester is naphthenic glycol, or glyceride, as the case may be. The naphthenic ester is dispersed in soapy water to produce a liquid polish, or, to produce a solid polish, it may be mixed with a wax, such as carnauba wax.

Another important use to which the recovered naphthenic acid can be put is in the synthesis of the alcohols of the naphthenic acids. For example, by reducing one, or more, of the acids of the naphthenic group of acids in a hydrogen atmosphere, at a temperature of about 200° C., pressure of about 150 pounds per square inch and in the presence of a catalyst (as finely divided nickel or copper), the naphthyl alcohols may be produced. Any, or all, of the naphthyl alcohols can be converted into naphthyl xanthates by treatment of naphthyl alcohol with $CS_2$ and sodium hydroxide. The naphthyl xanthates are especially useful as promoters in oil flotation processes. They are additionally well adapted to serve as accelerators in rubber vulcanizing and compounding. Other naphthenic acid derivatives that are useful, for example, as plasticizers in cellulose derivative plastics, are the naphthyl phosphates. The latter can be produced by treating the naphthyl alcohols, obtained as above, with $POCl_3$.

It will now be appreciated that the present method of recovering the naphthenic acid content of mineral oil sludge lends itself readily to the subsequent production of many naphthenic derivatives which have varied uses. Further, the economy of the recovery process permits the production of the said derivatives, whereas the methods employed in the prior art to recover the naphthenic acids have proven to be so uneconomical that the extensive use of the naphthenic acids was discouraged.

While I have indicated and described several steps for carrying my invention into effect, it will be apparent to one skilled in the art that my invention is by no means limited to the particular steps shown and described, but that many modifications may be made without departing from the scope of my invention as set forth in the appended claims.

What I claim is:

1. The method of recovering alkali metal naphthenates from mineral oil sludge which consists in dispersing the sludge in an aqueous medium, thinning the dispersed sludge, de-emulsifying the thinned sludge with a water soluble inorganic compound while maintaining the thinned sludge at a temperature substantially between 90° and 100° C. to effect substantially complete separation of the naphthenates and removing the mineral oil layer that is formed after de-emulsification.

2. The method of producing naphthenic acid from mineral oil sludge containing alkali metal naphthenate which consists in subjecting the sludge to a dispersion and thinning treatment whereby the sludge is readily de-emulsified, de-emulsifying the treated sludge with a water soluble inorganic salt while maintaining the thinned sludge at a temperature substantially between 90° and 100° C., removing the oil layer produced by deemulsification, and reacting the naphthenate layer with an acid to form naphthenic acid.

3. The method of treating mineral oil sludges containing alkali metal naphthenates which consists in dispersing the sludge in an aqueous medium, treating the dispersed sludge to render it de-emulsifiable, and de-emulsifying the treated dispersed sludge by subjecting the sludge to a temperature in excess of 90 degrees centigrade in the presence of a suitable water soluble de-emulsifying agent to produce an aqueous solution of alkali metal naphthenate substantially completely free of the mineral oil, and removing the latter.

JULIUS A. WUNSCH.